where each segment between breakpoints $a$ and $b$ is represented by the general linear equation:

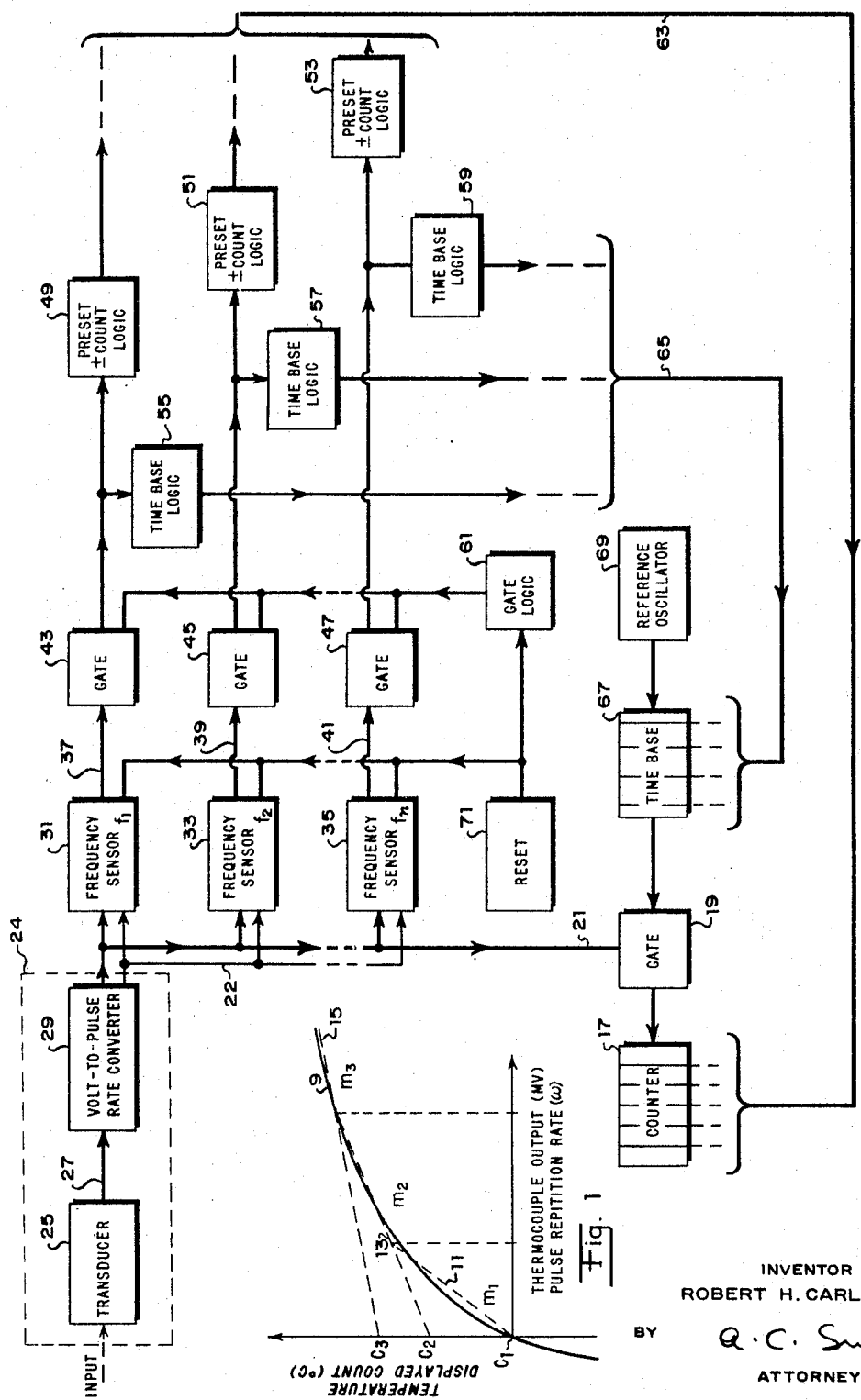

$$y|_a^b = m_1 x|_a^b \pm c_1$$

United States Patent Office 3,445,840
Patented May 20, 1969

3,445,840
TRANSDUCER OUTPUT INDICATOR
Robert H. Carlstead, Menlo Park, Calif., assignor to Hewlett-Packard Company, Palo Alto, Calif., a corporation of California
Filed Apr. 1, 1965, Ser. No. 444,764
Int. Cl. H03k 13/18; G01r 23/02
U.S. Cl. 340—347    4 Claims

ABSTRACT OF THE DISCLOSURE

Indicator apparatus includes an anolog to digital converter which operates on the non-linear output of a transducer to provide a direct indication of the physical quantity or condition which actuates the transducer. Digital repetition-rate sensors actuate preset count and time base logic circuits for simulating the break points of a piecewise approximation of the characteristic curve of a transducer. This eliminates the calculations involving the characteristic curve of the transducer which are usually required to convert from the units of the electrical signal obtained from the transducer to the actual physical units being measured.

It is an object of the present invention to provide apparatus which converts electrical signals from the output of a transducer directly into an indication of the magnitude of the physical quantity or condition to which the transducer responds.

It is another object of the present invention to provide apparatus for linearizing and displaying the output of a transducer in the units of the physical quantity or condition being measured by the transducer.

In accordance with the illustrated embodiment of the present invention, the output of a transducer is converted to a related pulse repetition rate which is detected by a plurality of frequency sensors which operate to determine the gate time of a pulse counter. The gate time is altered in response to the outputs of the frequency sensors to simulate the slopes of straight-line segments which approximate the characteristic curve of the transducer. The frequency at which a frequency sensor is actuated represents a breakpoint in the straight-line segments. The extrapolations of these straight-line segments back to the orthogonal coordinate of the graph of the characteristic curve of the transducer represent preset counts which are introduced into the pulse counter in response to selected outputs of the frequency sensors.

Other and incidental objects of the present invention will be apparent from a reading of the specification and inspection of the drawing in which:

FIGURE 1 is a graph of the non-linear characteristic curve of a typical transducer such as a thermocouple; and FIGURE 2 is a block diagram of the apparatus of the present invention which provides a direct readout of the physical quantity being tested by a transducer having a characteristic curve as shown in FIGURE 1.

Referring to the graph of FIGURE 1, there is shown a non-linear characteristic curve 9 for a thermocouple. In operation, the output of such a transducer is conventionally indicated or recorded in electrical units which must subsequently be converted into units of temperature being measured using calculations which relate the electrical units to the characteristic curve 9. In the present invention, the characteristic curve 9 of a transducer which may have plus and minus outputs for measured conditions above and below a reference level, is approximated by one or more straight-line segments 11, 13, 15, In the present invention, shown diagrammatically in FIGURE 2, $y$ represents the accumulated count of pulses displayed on counter, the slope $m$ of a line segment is represented by the time that gate 19 conducts the pulses of reptition rate $x$ which appear on line 21, and $c$ represents a count which is preset into the counter 17. The value of $c$ may be a minus count as well as a plus count as, for example, where the extrapolation of a straight-line segment for a given transducer curve is below the origin on the vertical axis. Also, $y$ may be minus (e.g. representative of a temperature below $0°$ reference level) for negative values of $x$ where the characteristic curve 9 of a transducer extends into the third quadrant of the coordinate axes.

Transducer 25, say a thermocouple, responds to temperature to produce an electrical signal on line 27 which is converted into a train of constant area pulses on line 21 by the voltage-to-pulse rate converter 29. It should be understood, of course, that an inherently digital-type transducer 24 such as an oscillating quartz crystal thermometer or the like may be provided which produces pulses having a repetition rate that is related to the physical condition being measured. Thus, the repetition rate of pulses on line 21 is related to the magnitude of the physical condition being sensed by transducer 25 (or by transducer 24).

The frequency sensors 31, 33, 35, etc. each include an integrating circuit and a trigger circuit which responds to the output of the integrator circuit to produce a steady signal on the output 37, 39, 41, etc. The frequency $f_1$, $f_2$, $f_n$ at which a sensor $3b$, 33, 35, etc. produces a signal on an output 37, 39, 41, etc. represents the frequency breakpoint of a pair of straight-line segments. There is thus provided a frequency sensor for each line segment required to approximate a characteristic curve with a given degree of accuracy. One or more of these frequency sensors may be provided for operation on frequencies which represent measured conditions having values below the origin of the graph of the transducer curve. This operating condition is evidenced by pulses on line 21 and by a signal (or absence of a signal) on line 22 provided by the converter 29 in response to the polarity of the signal on line 27. In practice, converter 29 may be of a type which produces repetitive pulses on one line for an applied voltage of one polarity and produces repetition pulses on another line for an applied voltage of the opposite polarity. A converter of this type would have each of the pulse lines connected to separate sets of frequency sensors to approximate both positive and negative portions of transducer characteristic curve.

In the illustrated embodiment of FIGURE 2, a selected one of the frequency sensors 31, 33, 35, etc. which responds to the repetition rate of pulses on line 21 only when a signal is present (or is absent) on line 22 during operation on the negative portion of the transducer characteristic curve or a selected one of these frequency sensors which responds to the repetition rate of pulses on line 21 during operation on the positive portion of the transducer characteristic curves produces a signal on its corresponding output 37, 39, 41, etc. This signal on an output line indicates that the pulse repetition rate is at least as high as the corresponding break-point frequency $f_1$, $f_2$, $f_n$ etc. of a pair of straight-line segments (either on the positive or negative portion of the characteristic curve) and is thus applied through the corresponding gate 43, 45, 47, etc. to a preset plus or minus count logic circuit, 49, 51, 53, etc. and to a time base logic circuit 55, 57, 59 etc. The gates are connected together to the gate logic circuit 61 which enables the gates in successive order with only one gate conductive at a time. This insures that for a changing input to the transducer 25, the gates are enabled in succession to simulate successive straight-line segments, each with a selected preset count and a selected time base or slope.

The preset count logic circuits 49, 51, 53, etc. may include a simple diode or relay switch matrix which produces signals on one or more lines of the conductor 63 for presetting the individual decade counting units of counter 17 to a selected number in a conventional manner.

The time base logic circuits 55, 57, 59, etc. may also include a simple diode of relay switch matrix which produces a signal on one or more lines of conductor 65 for setting the time base 67 to provide a selected period during which gate 19 may conduct the pulses on line 21 to the counter 17. In practice, the time base 67 may include a group of conventional preset counting units operating on the standard frequency from reference oscillator 69 such that a gate control signal is applied to gate 19 at the start of a time base counting period and is removed from gate 19 at the finish of such counting period, which period is then an integer number of periods of the standard frequency from reference oscillator 69. The reset source 71 supplies a signal to each of the frequency sensors 31-35, etc. and through the gate logic circuit 61 to each of the gates 43-47, etc. to reset the system to initial conditions after each count. This insures that the system will respond to input conditions that may be different from the input conditions present at the time of the last count. Thus, after resetting of the system, a given gate, say 45, may be activated in response to the output of transducer 25 actuating the converter 29 to produce pulses on line 21 above a selected repetition rate $f_2$ but below a higher repetition rate $f_n$. The gate logic circuit disables the remaining gates 43, 47, etc., the preset count logic circuit 51 presets a selected count, either plus or minus, into counter 17, and the time base logic circuit 57 operating on the time base 67 alters the time base or gate period of gate 19 to be an integer number of periods of the frequency from reference oscillator 69. Operation of the present invention in this manner thus corresponds to operation on the straight-line approximation of the non-linear curve of transducer 25 between upper and lower frequency breakpoints ($f_1$, $f_n$). For each characteristic curve of a transducer 25, each of the preset count logic circuits and each of the time base logic circuits may have to be altered to provide other preset counts and pulse counting times to insure that the straight-line approximation of such a characteristic curve is within a required degree of accuracy.

Where more than one transducer is provided, the present invention may operate on a time-shared basis on the output of each such transducer. This requires providing a scanning-type switch in line 27 for sequentially connecting each of such transducers in turn to the voltage-to-pulse repetition rate converter 29. If all such transducers are of the same type, (e.g. copper-constantin thermocouples), the preset count logic circuits and time base logic circuits need not be changed since all measurements taken by such transducers follow the same characteristic curve. However, where different types of transducers are sequentially scanned, the characteristic curve of each must be simulated using one or more frequency sensors, perhaps set at different frequency breakpoints than sensors used to simulate another characteristic curve. Also, the preset count logic circuits and time base logic circuits may have to be set to provide different preset counts and time bases for each such transducer scanned.

Counter 17 thus provides a direct indication of the physical quantity (e.g., temperature in degrees centigrade, pressure in pounds per square inch, etc.) being tested by a transducer.

I claim:
1. Signalling apparatus for producing a digital indication as a non-linear function of the value of an applied analog signal, the apparatus comprising:
   means connected to receive an applied analog signal for producing a recurring signal having a recurrence rate which is related to the amplitude of the applied analog signal;
   a plurality of sensors, each connected to receive the recurring signal for producing an output in response to the recurring signal attaining a selected recurrence rate;
   an indicator connected to receive the recurring signal for a selected period to count the recurrences of said recurring signal during said selected period;
   a first circuit responsive to the output of a sensor for altering said selected period; and
   a second circuit responsive to the output of said sensor for altering the count of said recurring signal provided by the indicator.

2. Signalling apparatus for producing a digital indication as a non-linear function of the value of an applied analog signal, the apparatus comprising:
   circuit means connected to receive an applied analog signal for producing pulses at a repetition rate which is related to the amplitude of the applied analog signal;
   a plurality of sensors, each connected to receive the pulses for producing an output in response to the pulses attaining a selected repetition rate and each producing an output in response to a different repetition rate;
   a counter and a gate;
   means including the gate for applying said pulses to said counter for a selected gate period to produce an indication of the count of pulses passed by said gate during said selected gate period;
   a gate control circuit;
   a first circuit for each of said sensors connected to said gate control circuit and responsive to the output of the corresponding sensor for altering said selected gate period; and
   a second circuit for each of said sensors connected to said counter and responsive to the output of said coresponding sensor for altering the count of said pulses provided by the counter.

3. Signalling apparatus as in claim 2 comprising:
   a sensor gate connected between the output of each of said sensors and the corresponding first and second circuits; and
   a gate circuit connected to said sensor gates for rendering conductive only one of said sensor gates at a given time and for rendering the remaining sensor gates nonconductive at said given time.

4. Signalling apparatus as in claim 3 wherein:
   said gate circuit renders conductive only the sensor gate which is connected to the sensor that produces an output in response to said pulses having attained a selected value of pulse repetition rate.

References Cited

UNITED STATES PATENTS 3,221,324  10/1965  Margopoulos _____ 340—347

MAYNARD R. WILBUR, *Primary Examiner.*

C. D. MILLER, *Assistant Examiner.*

U.S. Cl. X.R.

324—78